US006805041B2

(12) United States Patent
Colston et al.

(10) Patent No.: US 6,805,041 B2
(45) Date of Patent: Oct. 19, 2004

(54) METHODS AND APPARATUS FOR BREWING BEVERAGES

(75) Inventors: Martin E. Colston, Newbury (GB); Christopher J. Gee, Berkshire (GB); Jon W. Shaw, Hampshire (GB); Kevin C. Pope, Hampshire (GB); John C. Cooke, Hampshire (GB); Adrian B. Caroen, London (GB); Evgeny I. Rivin, West Bloomfield, MN (US); Victor R. Fey, West Bloomfield, MN (US)

(73) Assignee: Mars Incorporated, McClean, VA (US)

( * ) Notice: Subject to any disclaimer, the term of this patent is extended or adjusted under 35 U.S.C. 154(b) by 0 days.

(21) Appl. No.: 10/363,876
(22) PCT Filed: Sep. 5, 2001
(86) PCT No.: PCT/GB01/03978

§ 371 (c)(1),
(2), (4) Date: Jun. 19, 2003

(87) PCT Pub. No.: WO02/19875

PCT Pub. Date: Mar. 14, 2002

(65) Prior Publication Data

US 2004/0025701 A1 Feb. 12, 2004

(30) Foreign Application Priority Data

Sep. 6, 2000 (GB) .............................................. 0021907
Apr. 27, 2001 (GB) .............................................. 0110418

(51) Int. Cl.[7] .............................................. A47J 31/00
(52) U.S. Cl. ........................ 99/295; 99/302 R; 99/284; 99/287; 426/433; 426/112; 426/115
(58) Field of Search .......................... 99/284, 287, 295, 99/300, 302 R, 302 P; 426/433, 112, 115

(56) References Cited

U.S. PATENT DOCUMENTS

| 4,808,346 | A | | 2/1989 | Strenger |
| 5,755,149 | A | * | 5/1998 | Blanc et al. .............. 99/289 T |
| 5,794,519 | A | | 8/1998 | Fischer |

FOREIGN PATENT DOCUMENTS

FR        2 770 987 A1    5/1999

* cited by examiner

Primary Examiner—Reginald L. Alexander
(74) Attorney, Agent, or Firm—Fulbright & Jaworski L.L.P.

(57) ABSTRACT

An apparatus for the brewing of a beverage by transmission of an aqueous fluid through a sachet containing a beverage brewing ingredient. The apparatus includes one or more injectors to inject the aqueous fluid into the sachet during the brewing and a clamp for the sachet. The clamp has one or more members that are movable to open and close the clamp, the members having inner surfaces which in a closed position of the clamp define a cavity adapted to substantially enclose and support the sachet during the brewing. The members further define a beverage exit pathway in a lower part of the cavity wherein the inner surface of at least one clamp member includes at least one deformable region mounted on a support that is movable while the clamp is in the closed position. The shape of the cavity or of the exit pathway can be changed while the clamp is in the closed position to provide a desired brewing configuration of the sachet. The invention also provides methods of brewing beverages in such an apparatus and systems made up of the apparatus in combination with beverage sachets for use in methods of the invention.

60 Claims, 4 Drawing Sheets

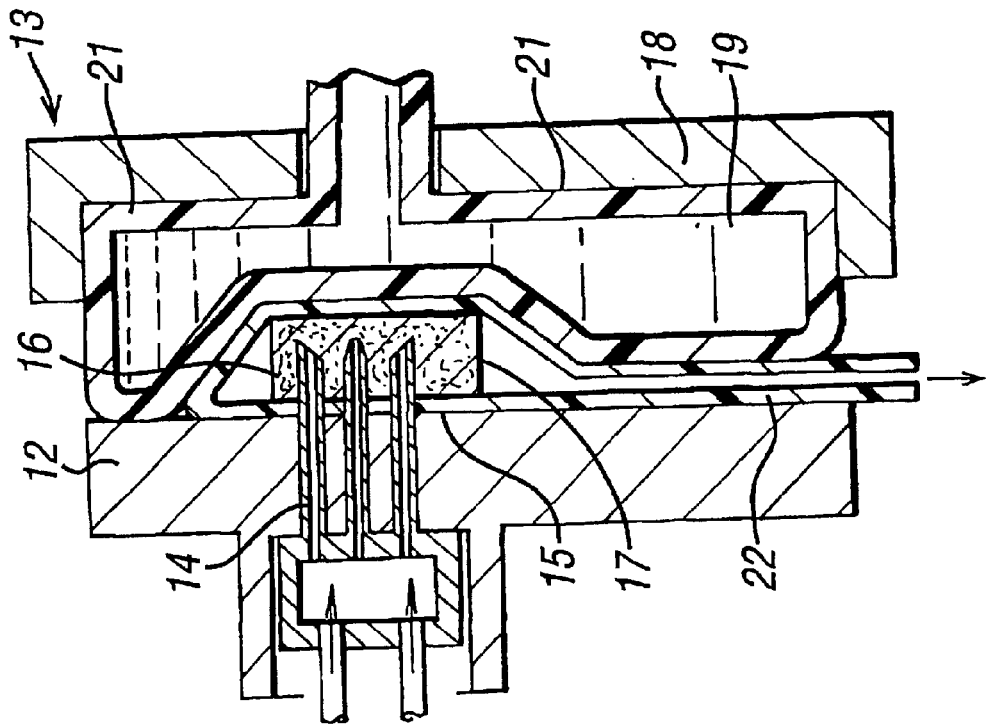
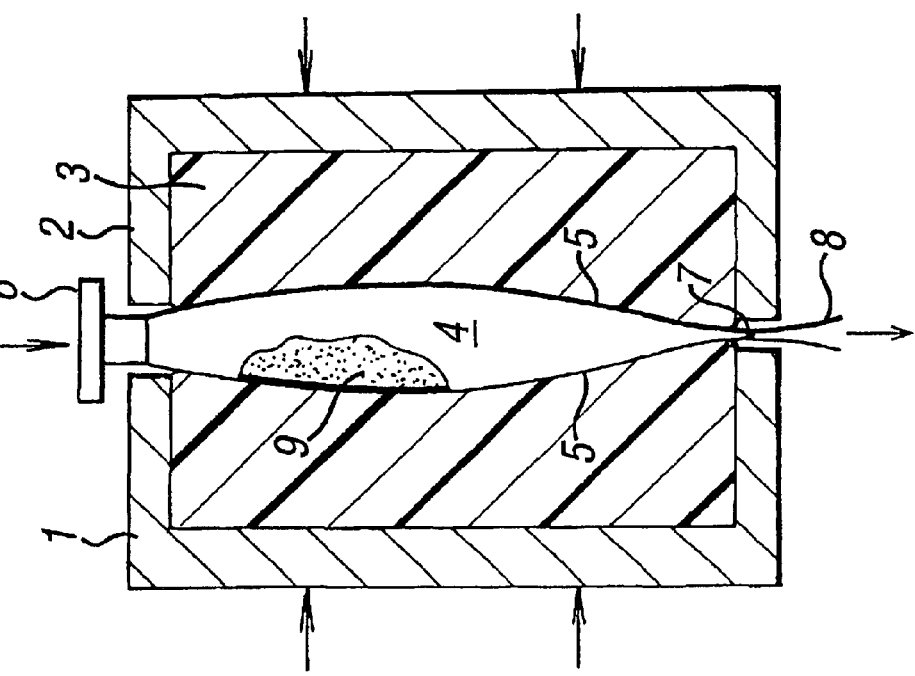

METHODS AND APPARATUS FOR BREWING BEVERAGES

The present invention relates to methods and apparatus for brewing beverages such as coffee or tea, including foamed beverages such as cappuccino.

It is known to brew individual portions of beverages such as a coffee and tea from prepacked individual sachets or capsules containing a single portion of the beverage brewing ingredient such as ground coffee or leaf tea. However, it is difficult to devise a packaging and brewing system that can be adapted to produce a full range of top quality freshly brewed beverages in individual portions, for example from vending installations.

Filter coffee and leaf tea are generally brewed at near-atmospheric pressure, but have different optimum brewing temperatures and times. Espresso coffee is brewed by forcing hot water through a compacted bed of coffee at a pressure of 5–15 bar and a temperature of 90° C. It has not hitherto been possible to brew individual portions of all of these beverages in a single apparatus.

GB-A-2121762, EP-A-0179641 and WO99/05036 describe a beverage brewing system according to which individual portions of beverage brewing ingredients are enclosed in flexible film sachets having an injection nozzle at the top and a seal at the bottom. A filter paper is also provided in a lower part of the sachet. In use, hot water is injected through the nozzle into the sachet. The beverage is brewed inside the sachet, and the seal at the bottom of the sachet is opened either before or during the brewing to allow the beverage to flow out through the bottom of the sachet. This apparatus provides very good quality, freshly brewed filter coffee and leaf tea in individual portions. However, the thin film sachets cannot withstand high brewing pressures inside the sachet, and therefore such sachets have not hitherto been used for brewing espresso coffee.

Furthermore, the sachets need to be formed from a relatively thick sheet materials, for example laminates formed from a layer of metal foil sandwiched between two thermoplastic films. This is needed in order to provide an oxygen and moisture barrier during storage, as well as to provide the sachets with sufficient strength to withstand the brewing conditions. Such sachets are then difficult to recycle, and contribute to landfill waste. Another difficulty is that the opening in the bottom of the sachet does not always direct the beverage accurately into the cup.

It is also known to brew individual portions of espresso coffee from individual capsules of ground coffee. The capsules typically contain a portion of ground coffee, tightly compacted in a capsule having a frustoconical or oblate spheroid shape and formed from air- and moisture-impermeable material. The capsule is inserted into a rigid, metal brewing chamber that is normally shaped to fit around the capsule tightly. The brewing chamber has a filter element in its base, means to pierce the underside of the capsule, and means to inject hot water at a pressure of 500–1500 kPa (5–15 bar) into the interior of the capsule to brew espresso coffee. Espresso coffee brewing capsules and systems of this type are described, for example, in WO93/17932 and WO94/02059.

A drawback of the existing espresso brewing capsules is that they are adapted for use with conventional espresso machines that have a rigid brewing cavity dimensioned to receive a bed of coffee of specific dimensions, and to apply the necessary pressure to such a bed of coffee. This means that the existing espresso capsule systems are not very flexible, either for varying the amount of coffee in the capsule, or for varying the degree of compaction of the coffee bed during brewing. A further drawback of the existing espresso systems is cross-contamination between the successive brews, since the beverage exiting the capsule passes through, and therefore contaminates, the base part of the brewing chamber.

EP-A-0521186 describes a capsule containing a compressed beverage brewing ingredient, such as ground coffee, for use in espresso-type machines. The capsule is deformable to assume the shape of the cavity of whichever espresso machine it is used in. This removes the need for a special adapter to adapt existing espresso machines to the exact shape and configuration of the capsule. Unfortunately, it also means that the coffee in the capsule may be insufficiently compacted for optimal espresso coffee brewing. The problem of cross-contamination by successive brews also exists for this configuration.

EP-A-0821906 describes methods of beverage brewing in which a vacuum pack containing a beverage brewing ingredient is placed in a clamp, hot water is injected into the vacuum pack through a hollow needle, and the brewed beverage is allowed to escape through a closing seam in the vacuum pack. The pack includes a movable plate opposite the closing seam of the vacuum pack that is used to compress the vacuum pack in the clamp before brewing. The plates making up the brewing cavity are rigid, flat plates. These plates cannot apply high pressure to squeeze the vacuum pack without risk of bursting the pack.

It is known to form edible foams from fresh milk, for example in milk shakes. It is also known to serve coffee and other hot beverages with a layer of hot milk foam over the liquid beverage. The hot milk foam is traditionally made by injecting steam under pressure through a hollow steam wand into cold fresh milk to heat and foam the milk. The milk foam is then poured onto liquid coffee to form the beverage, for example cappuccino or latte.

The milk foaming is normally carried out separately from the coffee brewing, because the essential oils present in coffee have deleterious effect on foaming. The traditional method of forming hot milk foam for cappuccino or latte does not lend itself to use in beverage vending installations. This is part because fresh or liquid milk is difficult to handle in such installations. Furthermore, most vending installations are not equipped to supply steam under pressure. In addition, the use of a steam wand immersed in the liquid milk would present cross-contamination and hygiene problems.

It is known to provide a powdered beverage whitener containing encapsulated nitrogen gas that produces a foam when it is dispersed in coffee. However, the foam does not have the same bulk and stiffness (spoonability) as a conventional cappuccino foam.

It is also known to produce a foam in a vending machine by depositing a powdered milk into a cup, followed by jetting hot water into the cup to dissolve the powdered milk and foam the milk by the action of high shear between the water jet and the milk. This suffers from the reduced consumer acceptability and mess associated with depositing a powdered milk into the cup. Furthermore, the milk powder may not dissolve completely. In order to achieve more complete dissolution of the powder it is necessary to move the jet relative to the cup by means of an X-Y table or similar equipment, thereby increasing the cost of the apparatus.

It is an object of the present invention to provide an improved apparatus for the brewing of beverages from sachets of beverage brewing ingredients.

It is a further object to provide such an apparatus adapted to brew beverages from sachets of beverage brewing ingredients wherein the packages can have varying dimensions and/or may contain varying amounts of the beverage brewing ingredient.

It is a further object of the present invention to provide a beverage brewing apparatus that permits beverage brewing to be carried out with novel combinations of brewing temperatures, pressures and brewing rates thereby resulting in new and improved beverages.

It is a further object of the present invention to provide a beverage brewing apparatus that is adaptable to carry out both high pressure and low pressure beverage brewing.

It is a further object of the present invention to provide a beverage brewing apparatus that produces little or no cross-contamination between successive brewed portions of beverages.

It is further object of the present invention to provide a beverage brewing apparatus that enables beverage brewing with less risk of mess and less solid waste than the apparatus and method of GB-A-2121762.

It is a further object of the present invention to provide methods of brewing beverages using an apparatus according to the invention, including improved methods of brewing foamy beverages.

It is a further object of the present invention to provide systems comprising a beverage brewer and beverage brewing sachets specifically adapted for use in the apparatus and method of the invention.

The intention is to provide portions of quality, freshly brewed beverages, especially from vending installations and similar equipment.

In a first aspect, the present invention provides an apparatus for the brewing of a beverage by transmission of an aqueous fluid through a sachet containing a beverage brewing ingredient, said apparatus comprising: one or more injectors to inject the aqueous fluid into the sachet during said brewing; and a clamp for the sachet, said clamp comprising one or more members that are movable to open and close the clamp, said members having inner surfaces which in a closed position of the clamp define a cavity adapted to substantially enclose and support the sachet during said brewing and further adapted to define a beverage exit pathway in a lower part of the cavity, and wherein the inner surface of at least one clamp member comprises at least one deformable region mounted on a support that is movable while the clamp is in said closed position, whereby the shape of said cavity or said exit pathway can be changed while the clamp is in said closed position to provide a desired brewing configuration of the sachet.

The apparatus according to the present invention is preferably adapted for the brewing of individual portions, e.g. cups, of the beverage. For example, the apparatus may form part of a beverage vending installation. The beverage may, for example, be coffee, tea, hot chocolate or soup. Preferably, the beverage is coffee or tea and more preferably the beverage brewing ingredient is ground coffee or leaf tea.

Preferably, the apparatus comprises a heater to supply an aqueous brewing medium such as hot water or steam, preferably hot water at a temperature of preferably about 80 to about 100° C. Preferably, the apparatus comprises a pump for the aqueous medium, and more preferably the pump can supply the aqueous medium at a pressure of 0.1 to 20 bar gauge, preferably 1 to 15 bar gauge and a rate of about 50 to about 2000 ml/min, more preferably about 60 to about 1000 ml/min of hot water.

Details of sachets suitable for use in the apparatus are given below. It is a particular advantage of the present invention that it enables a single apparatus to brew a range of beverages from a single sachet. It is a further advantage that the apparatus can accommodate a range of sachet sizes.

It is a feature of this aspect of the present invention that at least one clamp member comprises at least one deformable region. In other words at least one region of a member making up the inner surface of the brewing cavity is not entirely rigid. At least one of the inner surfaces making up the clamp cavity comprises a deformable region that permits the shape of that surface, and hence of the cavity or of the exit pathway, to vary under independent control after the clamp has been closed so as to conform to a desired brewing configuration of the sachet. This change in the shape of one of the cavity surfaces is usually a change in the curvature of the surface. For example, the deformable region may be resilient and/or flexible. The deformable region is mounted on a support that is independently movable while the clamp is in said closed position. That is to say, the support for the deformable region is movable independently of the other clamp members to vary the shape of the cavity. This enables the shape and volume of the cavity to be controlled by varying an external force applied to the support, for example a mechanical or hydraulic force.

In use, the sachet is normally substantially completely enclosed by, and in contact with, the inner surfaces of the clamp cavity.

Preferably, the deformable region is adapted to abut directly against and compress a region of the surface of the sachet during brewing. This contrasts with all previous beverage brewing equipment, in which the beverage brewing cavity is made up of rigid and usually fixed plates. The advantages of having a deformable region include the ability to adapt the cavity to sachets of different sizes, for example for brewing different strengths of beverage with the same amount of brewing liquid. The deformable region also enables pressure to be applied to the sachet, for example to compact a bed of the beverage brewing ingredient in the sachet during brewing. This, of course, is especially useful for brewing espresso-style coffee. Similarly, the ability to deform the brewing cavity in the exit region enables the size of the exit aperture to be controlled, and thereby enables the hydrostatic pressure in the brewing cavity during brewing to be controlled in conjunction with control over the rate of escape of the beverage from the cavity. Suitable control over the exit region shape also enables the beverage to be directed accurately into the receptacle.

The control over the shape of the brewing cavity provided by the deformable region may be static or dynamic. That is to say, the deformable region may be used to preset the shape of the cavity after the sachet has been clamped but before brewing, and to maintain that shape throughout the brewing step. Alternatively, the shape of the brewing cavity may vary in dynamic fashion during the beverage brewing as described in more detail below.

A particular advantage of the deformable beverage brewing cavity is that it enables the cavity to conform to, and support the beverage brewing sachet enclosed within the cavity, thereby enabling high hydrostatic pressures to be developed inside the sachet without bursting the sachet. Indeed, it is envisaged that the sachet could be formed with very thin walls, thereby reducing the amount of plastic waste material that remains after brewing.

Preferably, the clamp comprises one or more rigid base members, more preferably two such rigid base members, that are movable together in face-to-face or clam-shell fashion to grip the sachet.

The deformable region of the clamp inner surface may be a material that is conformable but substantially incompressible, preferably a resilient material, such as a layer of elastomer. Typically, the layer of elastomer is from 5 to 25 mm thick and has Shore hardness of from 10 to 60 Shore, preferably from 20 to 50 Shore. Preferably, the deformable layer is constrained by a rigid backing and rigid circumferential edges extending upwardly from the rigid backing around the layer, whereby the layer can support a pressure of 5 to 15 bar on the outer surface of the sachet without excessive deformation. Preferably, the resilient region should extend over the whole part of the inner surface of the clamp that will be in contact with any thin film portion of the sachet. More preferably, a layer of elastomer covers substantially the whole of the inner surface of at least one base member of the clamp that defines the cavity.

Preferably, the inner surface of the layer of elastomer is profiled to conform generally to the shape of the sachet. For example, the inner surface of the layer of elastomer is preferably concave. This enables the layer of elastomer, when a suitable clamping force is applied, to conform accurately to the outer surface of the pressurised sachet and thereby prevent the sachet from bursting. The accurate conformity of the clamp inner surface to the outer surface of the sachet in use also improves beverage brewing quality by reducing the channelling of liquid through the bed of beverage brewing ingredient, since it promotes uniform compression of the beverage brewing ingredient.

The resilience of the inner surface of the brewing cavity may differ in different regions of the surface so as to allow the shape of the cavity to change in response to pressure during brewing.

Preferably, the clamp has a clam shell configuration, whereby two concave base members are releasably pivoted together in face to face relation to clamp the sachet therebetween. Preferably at least one of the base members has an elastomeric coating over substantially the whole inner surface thereof. The base member may include a circumferential wall to enclose the edges of the elastomeric layer to reduce deformation of the layer under pressure. The force exerted on the sachet by the elastomeric coating can be varied, by example by varying the clamping force exerted between the two base members. The clamping force can be fixed at the start of the beverage brewing process, or it may be varied during the beverage brewing where dynamic clamping is desired.

Preferably, at least one layer of elastomer or other resilientlly supported flexible material is provided in the exit region of the brewing cavity to pinch the sachet against another clamp member in the exit region and thereby restrict the flow of beverage out of the brewing cavity.

A higher degree of conformability and greater dynamic control over the shape of the brewing cavity and exit region can be achieved where the deformable region comprises a movable region supported on a fluid reservoir. The movable region may be a region of flexible sheet material, typically comprising metal or polymeric material, or it may comprise a flexible layer of elastomer. The fluid reservoir is preferably a liquid reservoir and therefore substantially incompressible. Preferably, the apparatus further comprises a conduit to introduce or remove fluid from the reservoir in order to vary the shape of the cavity during or immediately prior to brewing. Control over the amount of fluid in the reservoir can be achieved, for example, by including a mechanical or electromechanical valve, or even an electrorheological fluid in the conduit. Preferably, the conduit is connected to a pump or other mechanical or electromechanical driving means for introducing or removing fluid from the cavity. The apparatus may include means to substantially equalising the pressure of a fluid inside the sachet and in the fluid filled reservoir, so as to minimise stress on the wall of the sachet.

A further degree of control over the shape of the brewing cavity can be obtained when at least one clamping member comprises a plurality of deformable regions that are mounted on a plurality of independently movable supports. The support may be independently mechanically movable, or the deformable regions may comprise a plurality of fluid filled reservoirs supporting a plurality of movable regions as hereinbefore described. The contents of the plurality of fluid filled reservoirs may be independently controlled. Of course, the inner surface of clamp may comprise, in addition to the one or more deformable regions supported on independent supports, at least one region of solid elastomer supported on a rigid base part of the clamp.

In certain embodiments dynamic clamping region may be provided in the exit region of the brewing cavity. The dynamic clamping region may be provided by a layer of flexible material such as elastomer on a fluid-filled reservoir. In the alternative it may be provided by a layer of flexible material or a layer of elastomer mounted on a mechanically movable support.

The maximum volume of the brewing cavity when the clamp is in the closed position is in the absence of internal pressure is from about 25 $cm^3$ to about 250 $cm^3$, more preferably from about 30 $cm^3$ to about 150 $cm^3$. The minimum volume when the side walls are fully compressed is preferably 50% or less of the maximum volume, more preferably 25% or less of the maximum volume.

As already noted, it is a feature of the apparatus according to the present invention that it may also control the size and configuration of the beverage fluid exit pathway from the brewing cavity. Preferably, the clamp defines a constriction in the region of the fluid exit, thereby enabling a high brewing pressure to be maintained in the sachet without blowing any part of the sachet or its contents out through the exit pathway. Preferably, the exit region from the brewing chamber comprises clamp members configured to pinch the bottom of the sachet to provide the constriction. More preferably, at least one of the members providing said pinch has a resilient inner surface in said fluid exit region. Preferably, at least one of the members providing said pinch comprises an inner surface with a recess defining a fluid exit pathway through said pinch when the said inner surface is pressed against a complementary inner surface on the clamp to define the exit region. The fluid exit pathway may for example be linear, serpentine or dendritic. The fluid exit pathway may be adapted to form a high velocity jet of liquid, as described for the below.

The apparatus preferably comprises a injector tube or tubes for injecting the aqueous fluid into the interior of the sachet when the sachet is held in the brewing cavity. Preferably, the apparatus further comprises a mechanism operatively associated with the clamp to retract the injector tube or tubes when the clamp is opened. The injector tube may be inserted into a nozzle on the top of the sachet as described in GB-A-2121762. In preferred embodiments, the injector tube or tubes pierce a side wall of the sachet to inject fluid directly into the interior of the sachet. The injector tube or tubes may project into the brewing cavity at an oblique angle to the exit direction of the beverage cavity, more preferably substantially perpendicularly to exit direction of the beverage cavity. This is preferable to the use of a nozzle in the sachet because of the greater ease of manufacturing of sachets without nozzles.

In certain embodiments of the beverage brewing apparatus according to the invention, the injector projects inwardly from an inner surface of one of the clamp members, and the inner surface comprises a recess around the injector. The recess is preferably a shallow, circular or polygonal recess. The term "recess" signifies a region of the member surface that is displaced outwardly from the center of the brewing cavity, relative to the edges of the member. Typically the depth of the recess is from about 1 mm to about 10 mm, for example from about 2 mm to about 5 mm. Typically, the mean width or diameter of the recess is from about 5 mm to about 75 mm, for example from about 10 mm to about 40 mm. Preferably, the injector projects inwardly from a rigid clamp member, i.e. a clamp member of fixed configuration.

In use, the sachet being brewed in the cavity bulges outwardly into the recess, thereby presenting a smooth, taut surface to the injector and thereby assisting reliable piercing of the sachet by the injector. Preferably, the injector is a sharpened tube to assist piercing of the sachet.

In a second aspect, the present invention provides a method of brewing a beverage comprising the steps of: providing a sachet formed at least in part from flexible sheet material and containing a beverage brewing ingredient; inserting the sachet into the clamp of an apparatus according to the present invention; and injecting an aqueous fluid into the sachet in the clamp to brew the beverage; and collecting the beverage exiting from the exit pathway of the clamp.

The step of inserting is preferably carried out such that a liquid conduit region provided in the sachet extends through the exit region of the clamp, whereby the beverage exiting the sachet does not contact the clamp. This substantially eliminates cross-contamination between successive brews. Preferably, a lower region of the sachet is gripped or pinched by an exit region of the clamp, whereby the outflow of beverage from the brewing region is restricted.

Preferably the aqueous fluid is injected at a pressure of from about 0.1 to about 16 bar gauge, more preferably from 1 to 10 bar gauge, and most preferably (for espresso brewing) from about 5 to about 10 bar gauge. Preferably, the aqueous fluid is injected at a temperature of from 1 to 100° C. Some extraction in dilution processes may be carried out at ambient temperature such as 10 to 25° C. Hot beverage brewing is typically carried out at from about 80 to about 95° C. Preferably, the aqueous fluid consists essentially of water. In particularly preferred processes, the aqueous fluid consists essentially of water at 60 to 100° C., the water is injected at a pressure of from about 2 to about 10 bar gauge, and the brewing ingredient comprises ground coffee. This enables espresso-type coffee to be produced.

Preferably, the aqueous fluid is injected into the sachet by a peristaltic or piston pump, preferably at an average rate of from about 50 to about 2000 ml/min and more preferably from about 60 to about 1000 ml/min. Preferably, the aqueous fluid is injected in intermittent or pulsed fashion to optimise the organoleptic properties of beverage. Preferably, the method further comprises the step of injecting air into the sachet after brewing to expel residual beverage from the sachet.

Preferably, the method further comprises moving the deformable region after the clamp has been closed, for example immediately before brewing, in order to compress the brewing ingredient in the sachet.

Preferably, the method further comprises moving the deformable region during brewing in order to vary the configuration of the sachet during brewing. This enables the beverage quality to be optimised, and also permits the brewing of completely new beverage types, for example beverages having part-espresso and part-filter coffee characteristics. It has also been found that relaxing the pressure slightly during brewing provides an improved espresso-type product.

In certain embodiments the method comprises moving the deformable region of the clamp outwardly during brewing to allow expansion of the sachet in the cavity. This can allow the brewed beverage to flow more freely out of the sachet. In certain embodiments the sachet is made from materials that undergo plastic or elastic deformation so that the sachet expands without rupturing to fill the enlarged cavity.

Preferably, the method further comprises moving the deformable region in order to compress the sachet to expel liquid from the sachet. This can be used, for example, to squeeze out any remaining beverage from the sachet after brewing is complete. This is more efficient than air blowing alone in removing residual water from the sachet, and also compresses the sachet thereby reducing the volume of waste sachets produced by the process, and also reducing the amount of waste water leaking from the sachets. Preferably, volume can be reduced to less than 50% of the brewing volume.

Preferably, the method further comprises moving the deformable region before, during or after brewing in order to regulate the rate of flow of the beverage out of the cavity and the fluid pressure maintained inside the cavity by regulating the effective cross-section of the exit region.

Preferably, the method further comprises oscillating the movable region during brewing to agitate the beverage brewing ingredient, or to pump liquid through the sachet.

Preferably, in all of the above embodiments, the deformable region comprises a flexible membrane supported on a fluid-filled reservoir, whereby the region can be moved by pumping fluid into or out of the reservoir. However, the invention also encompasses movable regions that are movable by mechanical or electromechanical means.

A further advantage of the beverage brewer according to the invention is that it can be adapted to produce a foamable milk-containing beverage. Specifically, in such embodiments the beverage brewing ingredient comprises a product capable of forming a foamed beverage, including chocolate, coffee and dairy and non-dairy whiteners. In typical embodiments the beverage brewing ingredient consists essentially of a partially or completely dehydrated dairy or non-dairy milk product such as a milk powder or granulate. The milk product may form part of a beverage formulation, such a hot chocolate. The dry weight of the foamable ingredient may be from about 1 to about 50 g, preferably from about 5 to about 15 g. In other words, the amount of foamable ingredient in each package is preferably sufficient for one portion of the foamed product, e.g. one cup of a foamy beverage.

The brewing cavity is configured to provide efficient mixing and dispersion of the foamable material with the injected water. The exit region of the brewer is preferably configured so that the liquid exiting from the exit pathway of the clamp emerges as at least one jet having a diameter of from about 0.5 to about 2 mm, more preferably about 0.7 to about 1.5 mm and most preferably about 1 mm. The jet velocity is preferably from about 5 to 50 m/sec. The high shear resulting when this jet hits a liquid surface results in foam formation in the receptacle positioned to receive the jet. This can result in a liquid having a high volume fraction (about 25% or more) of a stable, stiff foam thereon. This liquid can be made into a foamed coffee or tea drink by brewing a sachet of coffee or tea sequentially in the same brewer. A similar jet of coffee can form an espresso-style "crema" on the coffee. The jet may be directed onto sides of the cup to dissipate its energy. The jet may also pass through an energy diffusing form in the exit region of the capsule in some embodiments.

The jet may be formed by a jet-forming structure in an exit region of the sachet, for example a nozzle. Alternatively, a jet-forming constriction may be imposed on the exit region of the sachet by compression in the exit region of the clamp. The internal cross-section of the jet-forming outlet is normally a regular shape, and preferably it is substantially circular. Since aqueous liquids are substantially incompressible and not significantly viscoelastic, it follows that the internal cross-sectional area of the jet-forming region of the outlet is generally from about 0.2 to about 3 mm$^2$, preferably from about 0.4 to about 2 mm$^2$, for example about 1 mm$^2$. More than one jet may be provided in order to speed up the liquid flow rate and reduce brewing times.

If the constriction (narrow bore, jet forming region) of the outlet is too short, then the outlet tends to form a spray rather than a jet. If the constriction is too long, then the pressure drop across the constriction may be too high. Accordingly, the constriction preferably extends for a distance of from about 1 to about 5 mm, preferably 2 to about 4 mm along the direction of liquid flow.

The term "sachet" as used in this specification refers to any portion pack containing a predetermined quantity of a beverage brewing ingredient, including capsules comprising one or more rigid wall members. Preferably, the sachet comprises at least one region formed from a flexible film material to permit deformation of the sachet in response to externally applied pressure.

In certain embodiments the beverage brewing sachet comprises a capsule containing a beverage brewing ingredient and a flexible liquid guide extending from the capsule, wherein the liquid guide is provided with a freshness barrier that is releasable during brewing to enable a beverage brewed within the capsule to escape by flowing through the liquid guide.

Preferably, the sachet comprises at least one region of the capsule formed from a flexible film material to permit deformation of the sachet in response to externally applied pressure. More preferably, the sachet comprises a pouch formed from flexible film material, for example a pouch manufactured on form/fill/seal equipment. The sachet is formed from substantially air- and moisture-impermeable material so as to maintain the freshness of the beverage brewing ingredient during storage before use.

The term "liquid guide" refers to a structure comprising a duct, capillary, tube or a conduit that provides a predetermined pathway for beverage exiting the capsule to prevent the beverage contacting the brewing apparatus as it exits the capsule and to guides the beverage towards a receptacle for the beverage. Preferably, the liquid guide is formed integrally with at least a part of the capsule, e.g. by molding from a single piece of thermoplastic or by bonding together sheet materials to form both the capsule and the guide.

The liquid guide is flexible over at least a part of its length. This enables the beverage stream to be directed accurately into a desired region of a cup and allows for great adaptability in the design of the beverage brewer, for example the guide can be bent to take the liquid flow from a horizontal direction to a vertical direction. In addition, the flexibility of the liquid guide preferably renders it compressible so that it can be constricted by the beverage brewing clamp to maintain an elevated pressure in the capsule during brewing and to control the rate of flow through the guide. For example, the liquid guide may be formed from two sheets of liquid impermeable film material in face to face relationship. The beverage may be guided out between the sheets by capillary action, and/or through a conduit defined by lines of bonding between the sheets, or impressed or embossed in the sheets. Preferably, the liquid guide extends for at least 10 mm, more preferably at least 15 mm or 20 mm outside the capsule.

Preferably, the liquid guide is tapered. This assists the liquid guide in directing the beverage to a predetermined dispensing point at the tip of the liquid guide.

The term "freshness barrier" refers to a barrier that is substantially impermeable to air or moisture so as to preserve the freshness of the beverage brewing ingredient by preventing ingress of air or moisture through the liquid guide before brewing commences. The freshness barrier may be released by an external mechanical force or thermal field applied during brewing. The freshness barrier is preferably releasable by the action of pressure and/or hot water from inside the sachet during brewing. For example, the freshness barrier may comprise a layer of a sealant that is released by the action of heat and/or moisture, such as an adhesive as described in EP-A-0179641 or WO99/05036.

In other embodiments the invention makes use of a sachet containing a solid beverage brewing ingredient, wherein: the sachet comprises front and back sheets of substantially water-impermeable film material, each sheet having a respective shape; the front and back sheets are bonded together around a bonding perimeter to define a capsule containing the beverage brewing ingredient within the perimeter and margins of each sheet extending outside the perimeter; and the margins include a tapered margin region on a first side of the capsule.

The tapered margin region preferably has a maximum length (measured radially from the edge of the capsule) of at least 10 mm, more preferably of at least 15 mm, most preferably at least 20 mm. The tapered margin region preferably defines a liquid guide as hereinbefore described in relation to the first aspect of the invention. The tapered margin region is preferably substantially triangular, optionally with curved sides and/or rounded corners. The maximum width of the tapered region is preferably from 1 to 5 cm, more preferably from 2 to 4 cm. The base of the tapered region may merge with the side edges of the sachet, for example in the case of an oval sachet having a circular capsule centered thereon.

Preferably, the front and back sheets are bonded together on the first side of the capsule adjacent to the tapered margin region by a bond that is releasable by the hot water and/or pressure within the capsule to allow a beverage brewed in the capsule to escape from the capsule by passing between the front and back sheets in the wider margin region.

The film material used to form the sachet according to any aspect of the invention is preferably a laminated film formed from layers of thermoplastic and metal foil.

In other embodiments the invention makes use of a sachet containing a solid beverage brewing ingredient and/or foam forming ingredient wherein: the sachet comprises front and back sheets of substantially water-impermeable film material each having a respective shape; the front and back sheets are bonded together around a bonding perimeter to define a capsule containing the beverage brewing ingredient within said perimeter and a margin of each sheet extending outside the perimeter; the margin is at least 10 mm wide on at least a region of said perimeter; and the front and back sheets are bonded together adjacent to the wider margin region by a bond that is releasable by the hot water and/or pressure from within the capsule to allow a beverage brewed in the capsule to escape from the capsule by passing between the front and back sheets in the wider margin region.

The wider margin region preferably defines a liquid guide as hereinbefore described. For example, the wider margin region is preferably tapered.

Preferably, the sachets have an elongated shape. Preferred shapes (in plan view) include substantially rectangular, oval, tapered or an isosceles triangle. In the case of the tapered or isosceles triangular shapes, the narrower end of the shape is preferably the end where the liquid guide or wide margin is located.

Preferably, the center of the capsule is displaced from the center of the sachet. That is to say, the center of gravity of the capsule (in plan view) is displaced from the center of gravity of the sachet (in plan view). Preferably, the displacement is along the longitudinal axis of the sachet.

The beverage brewing ingredient may comprise or consist of an ingredient that disperses completely in hot water, such as instant coffee, hot chocolate, or a concentrated milk, cream, creamer, milk powder or milk substitute. The beverage brewing ingredient in the sachets according to the present invention may comprise or consist of materials that do not completely disperse in the water used to brew the beverage, for example it preferably comprises ground coffee or leaf tea. Such beverage brewing ingredients should be retained in the sachet and preferably do not escape from the sachet with the beverage. This may be achieved by providing a filter for the beverage brewing ingredients within the sachet. In certain embodiments, the filter is a sheet of filter material bonded around its edges to a front or back face of the sachet, whereby the beverage flows through the filter material in a direction substantially perpendicular to the said front or back face. This maximises the area of filter available for filtration. The layer of filter material may be substantially coextensive with the front or back sheet of the capsule.

Preferably, the sachet contains from about 2 gm to about 12 gm of ground coffee or from about 1 gm to about 5 gm of leaf tea. In other words, the sachet is preferably adapted to brew a single cup of beverage. The beverage brewing ingredient may be in the form of one or more compressed pieces, such as a compressed tablet of ground coffee. The use of compressed pieces assists in preserving the freshness of the ingredient, and may reduce the total bulk of the package. The brewing cavity may be shaped to fit a particular tablet containing sachet.

In a further aspect, the present invention provides a system for brewing a beverage by a method according to the invention, said system comprising a beverage brewer according to the invention and at least one beverage brewing sachet for use in the brewer.

Preferably, at least one beverage brewing sachet comprises a first sachet containing a foamable dehydrated milk and a second sachet containing a coffee or tea brewing ingredient. These can be brewed in sequence as described above, preferably starting with the milk sachet, to provide a foamed drink, such as cappuccino coffee.

In certain embodiments the beverage brewer comprises a second clamp for holding a second sachet for simultaneous or sequential brewing of first and second beverage components from the first and second sachets. The beverage brewer may be adapted to open both clamps simultaneously for loading of sachets.

Specific embodiments of the present invention will now be described further, by way of example, with reference to the accompanying drawings, in which:

FIG. 1 shows a schematic cross-section through a first embodiment of the brewer of the invention having solid elastomeric clamp surfaces with the clamp in the closed, brewing configuration and showing a sachet being brewed in the clamp.

FIG. 2 shows a schematic partial cross-section through a second embodiment of the brewer of the invention having one static clamp face and one dynamic clamp face showing a sachet being brewed in the clamp.

Figure 5A:
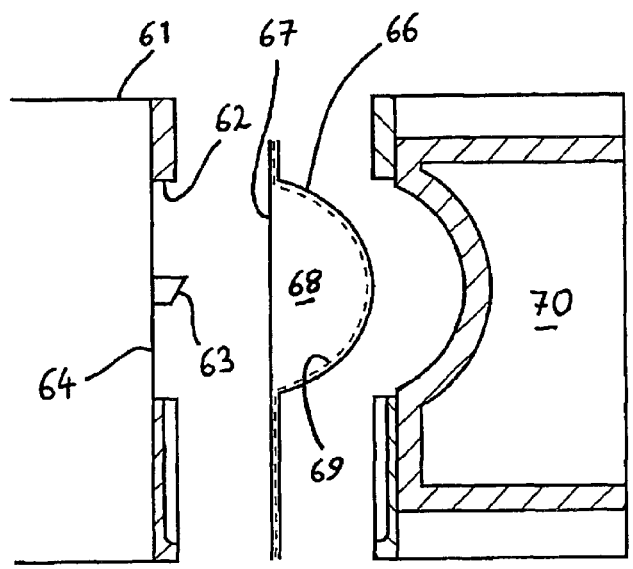
Figure 5B:
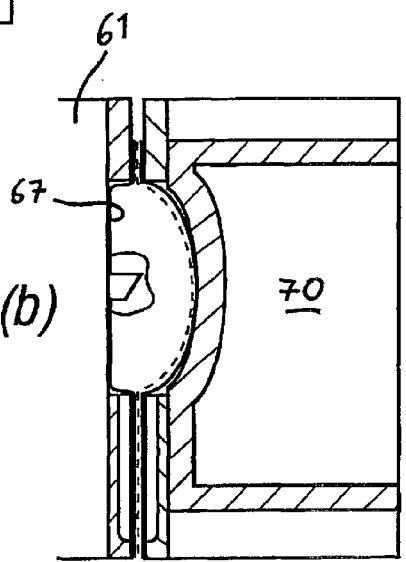
Figure 5C:
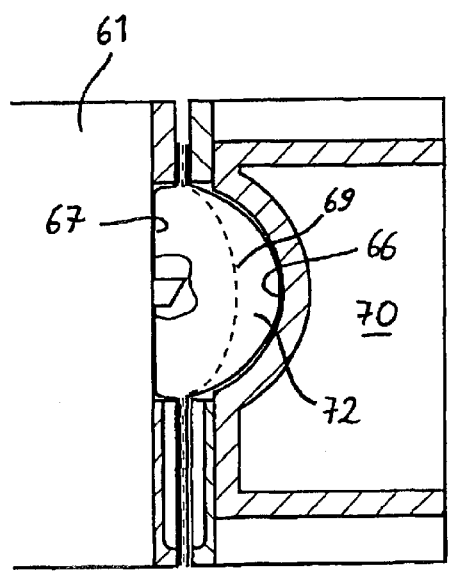

FIGS. 5(a) to 5(c) show partial schematic cross sectional views of steps in the brewing of a beverage from a brewer and sachet system according to a further embodiment of the invention.

Figure 6:
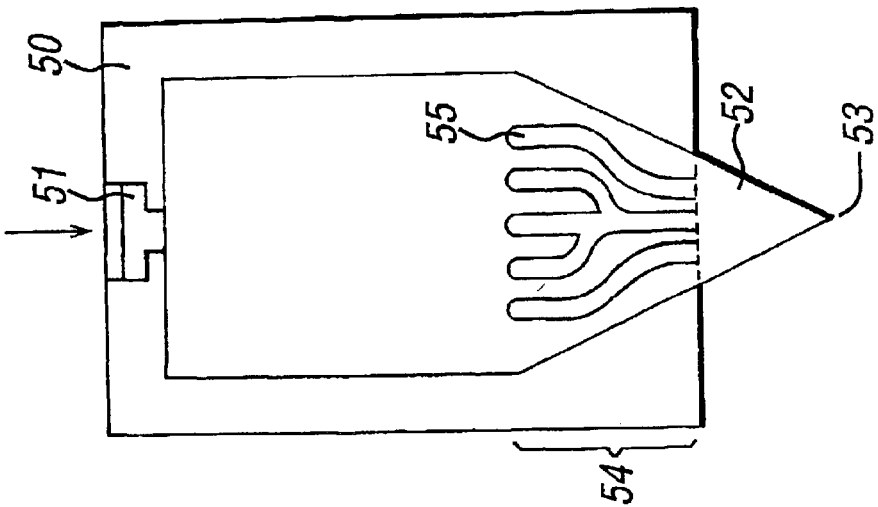

FIG. 6 shows a top plan view of a beverage brewing sachet after brewing in an apparatus according to a further embodiment of the invention, showing a beverage exit manifold formed by deformation of the sachet in the exit region.

Referring to FIG. 1 the apparatus comprises rigid metal base members 1, 2 that are clamped together in face-to-face relation by a clamping mechanism (not shown). The rigid base member are spaced apart in the clamped position, whereby the clamping force can be adjusted while in the clamped position to provide the desired compression of the coffee in the brewing cavity.

Each base member 1, 2 is lined with a solid layer of elastomer 3, an inner surface of which is slightly concave to define the brewing cavity. The elastomer is a silicone elastomer having a Shore hardness of about 40.

A beverage brewing sachet 4 is received in the cavity between the two clamp portions. The construction of the sachet 4 is substantially similar to the sachets described in EP-A-0179641. That is to say, the sachet is formed from two sheets of air- and moisture-impermeable plastic film material 5 bonded together around their periphery. A plastic nozzle 6 is inserted in the top edge of the sachet, and a bottom seal 7 of the sachet is made by bonding together the front and back sheets of the sachet with a sealant resin that is released by the action of heat and moisture during brewing. The bottom ends 8 of the thermoplastic sheets 5 project through the exit region of the clamp, and function as a conduit to guide beverage out of the clamp.

The sachet is filled with ground coffee 9, and this coffee bed is tightly compressed by the action of the clamp. The sachet may contain a filter paper proximate to the exit region of the sachet as described in EP-A-0179641. However, in this particular embodiment a filter is provided by a layer of nonwoven polypropylene web (not shown) bonded to one of the sachet sheets around the beverage brewing ingredient.

The elastomeric clamps enable the size and shape of the brewing cavity to be varied simply by varying the closing force applied to the rigid base members. This provides greatly increased flexibility and control over the brewing process.

In use, the apparatus may be used to brew espresso coffee by clamping the sachet tightly between the elastomeric clamps, and then injecting water at temperature of about 90° C. at a pressure of typically 5 to 20 bar, preferably 10 to 15 bar in continuous or pulsed mode to brew the espresso. The elastomeric clamps maintain the desired pressure in the coffee bed for espresso brewing. Furthermore, the pinch applied to the exit region of the sachet by the elastomeric clamps prevents the water pressure from blowing out the coffee grounds from the sachet. Finally, the conformability of the elastomeric clamps supports the walls of the sachet against bursting, and reduces channelling of the water through sides of the coffee bed.

The apparatus of FIG. 1 can be adapted for brewing filter coffee simply by clamping the sachet less tightly and by injecting a larger amount of water relative to the amount of coffee in the sachet. The walls of the sachet are preferably still supported by the elastomeric clamp, so as to reduce the risk that the sachet will burst and to optimise the shape of the brewing cavity.

It will be apparent that dynamic clamping effects can be achieved by varying the position of the rigid members during brewing. For example, the pressure on the cavity could be reduced during brewing to achieve a transition from espresso-style brewing to filter-type coffee brewing in a single brewing operation. Alternatively, the rigid members could be oscillated to agitate the bed of coffee in the sachet during brewing. Preferably, clamp is compressed to minimise the cavity volume at the end of the brewing operation in order to squeeze as much beverage as possible from the sachet. This is assisted by injecting air into the sachet through the injectors 14 after brewing to expel the remaining beverage. The combination of compression with air injection is much more effective that air injection alone. Furthermore, the resulting compression sachet takes up less space in the waste storage unit, and contains less liquid that could leak out and contaminate the equipment.

Referring to FIG. 2, this embodiment of the apparatus and method according to the invention uses a brewing clamp comprising a first, rigid piece 12 and a second, conformable piece 13. Three hollow needle injectors 14 extend through the rigid clamp piece 12 and pierce a first face 15 of beverage brewing sachet 16. The sachet 16 contains a compressed bed of coffee 17. The variable configuration clamp 13 comprises a rigid base member 18 and a fluid reservoir 19 supporting an elastomeric membrane 20. The fluid reservoir 19 enables the elastomeric membrane 20 to conform to the top surface 21 of the capsule or sachet 16. The clamping pressure applied to the sachet 16 can be regulated by varying the clamping force between the clamp elements 12 and 13, and also by varying the liquid pressure in the reservoir 19.

The sachet 16 includes a liquid conduit region 22 that extends through and beyond the exit region of the clamp, and through which the brewed beverage passes thereby preventing contamination of the clamp by the brewed beverage and cross-contamination between beverages brewed from successive sachets.

In use, the clamp according to this aspect of the invention operates substantially in the same fashion as the clamp of FIG. 1, but offers the additional advantage that dynamic clamping effects can be achieved by pumping liquid into and out of the reservoir 19 during brewing. For example, the pressure on the cavity could be reduced during brewing to achieve a transition from espresso-style brewing to filter-type coffee brewing in a single brewing operation. Alternatively, the amount of fluid in the reservoir could be oscillated to agitate the bed of coffee in the sachet during brewing. Preferably, additional fluid is pumped into the reservoir at the end of the brewing operation in order to squeeze as much beverage as possible from the sachet. This is assisted by injecting air into the sachet through the injectors 14 after brewing to expel the remaining beverage.

The injector hollow needles may be coupled to the clamp so that they retract when the clamp is opened in order to avoid any risk of injury to the user.

Figure 3:
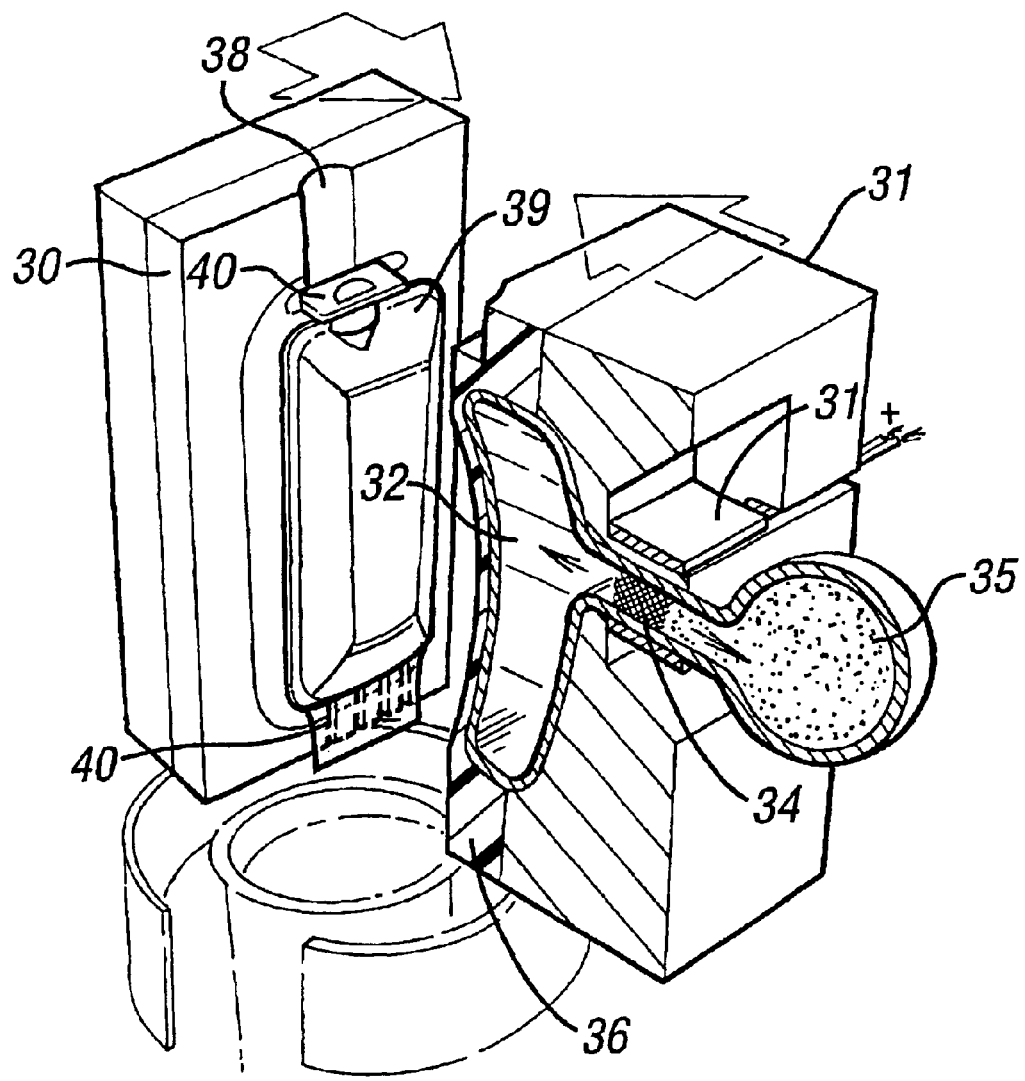
FIG. 3 shows a schematic perspective view, partially cut away, of a third embodiment of the invention having one static clamp face and one dynamic clamp face; and showing a sachet about to be brewed in the clamp.

Referring to FIG. 3, the alternative embodiment shown in the drawing includes a rigid clamp element 30 and a conformable clamp element 31. The conformable element 31 has a first region facing the beverage brewing cavity that has an elastomeric membrane supported on a liquid reservoir substantially similar to the embodiment of FIG. 2. However, the liquid reservoir 32 is filled with an electrorheological fluid, and the pressure in the reservoir 32 is regulated by means of electrodes 33 disposed on either side of a conduit 34 leading to electrorheological reservoir 35.

A lower part of the conformable clamp element is covered with a layer of solid elastomer 36.

The rigid clamp element 30 includes a recess 38 for insertion of a water injection hollow needle, and a recess shaped to receive a sachet 39 including a nozzle 40. Shallow recesses 41 are provided in the bottom, beverage exit region of clamp element 30 to define the conduits for beverage exit from the brewing cavity when the rigid clamp element 30 is in abutment with the solid elastomeric region 36 of the conformable clamp element 31.

Figure 4:
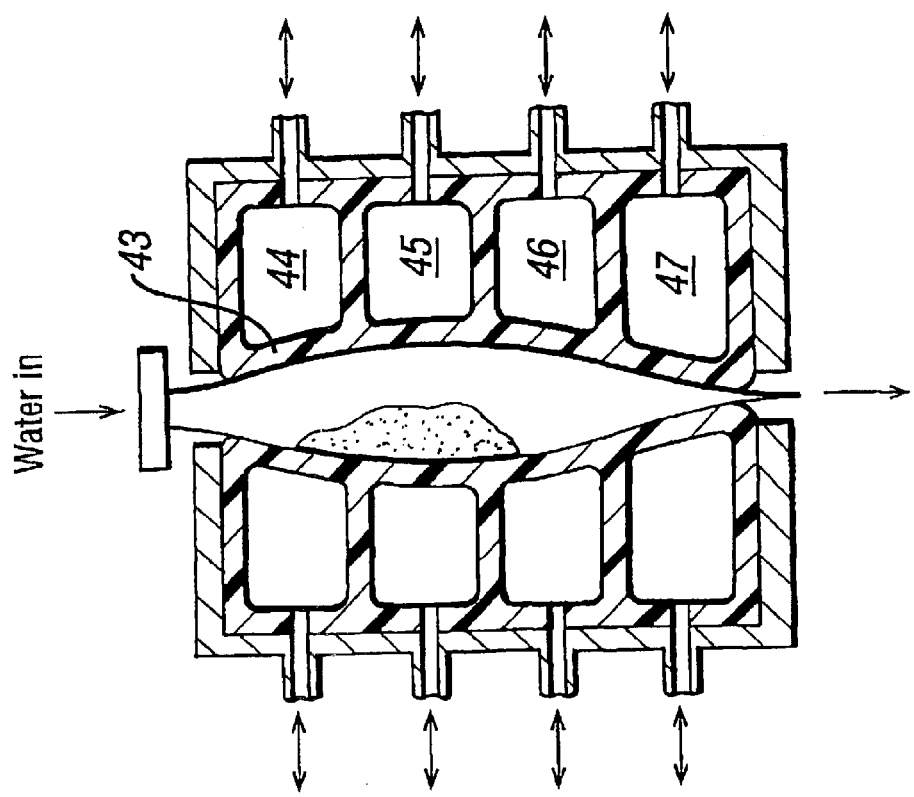
FIG. 4 shows a partial schematic cross-sectional view of a fourth embodiment of the invention having multiple independently deformable regions in each clamp face.

Referring to FIG. 4, the embodiments shown schematically therein resembles the embodiment of FIG. 1, but with the solid elastomeric linings of FIG. 1 replaced by an elastomeric membrane 43 supported on four fluid filled chambers 44, 45, 46 and 47. Each of the fluid-filled chambers is independently connected through a conduit to valve and pump means for controlling the volume and pressure of fluid in the chambers 44, 45, 46 or 47 independently. This opens up further possibilities for dynamic clamping of the sachet during brewing, in particular to regulate the flow rate of beverage through the exit region by lowering the pressure in the cavity 47, or to agitate the contents of the sachet by oscillating or peristaltic pumping of the membrane 43.

Referring to FIGS. 5(a) to 5(c), the system according to this embodiment of the invention comprises a brewer having a clamp similar to that of FIG. 2. However, the fixed clamp member 61 has a circumferential step 62 around the injector 63, defining a circular recess 64 in the rigid clamp member 61.

The embodiment of FIGS. 5(a) to 5(c) comprises a sachet having front and back faces 66, 67 of flexible, deformable sheet material defining a capsule 68 for the beverage brewing ingredient, such as ground coffee. A filter sheet 69 of spunbonded nylon is coextensive with the back face of the sachet and is bonded to the back face 67 of the sachet around the capsule.

Referring to FIG. 5(b), the sachet inserted into the brewing cavity and the hydraulic reservoir 70 of the deformable clamp member is pressurized to about 12 bar. This presses the back face 67 of the sachet against the rigid clamp member, and in particular causes the back face 67 to deform and bulge into the recess 64 in the rigid clamp member. The resulting taut, smooth back face 67 is efficiently pierced by the injector needle 63. Water at 90° C. and 12 bar pressure is then injected into the sachet to brew espresso-style coffee in the sachet.

Referring to FIG. 5(c), some of the liquid in the hydraulic reservoir 70 is then reduced during the brewing to allow the front face 66 of the sachet to bulge outwardly by plastic deformation. Since the filter sheet 69 is less deformable than the front sheet 66, this creates a beverage zone 72 in the expanded sachet, and efficient flow of the beverage through the filter sheet.

Referring to FIG. 6, the used sachet shown in the drawing comprises front and back faces of air- and water-impermeable sheet material formed from a layer of metal foil laminated between two thermoplastic films. The sheets are bonded together around edges 50 to form an air-tight seal around the beverage brewing ingredient. The bonding seal in the lower part of the sachet is formed from an EVA adhesive that is released by the action of water, heat and pressure inside the cavity when the beverage is being brewed, to allow the beverage to escape from the brewing region. A plastic nozzle similar to that shown in FIG. 1 is inserted into the top edge of the sachet. The bottom edge of the sachet includes projecting tongues 52 of the sheet material in face-to-face configuration that guide liquid beverage out of the sachet, and that terminate in drip point 53. The side edges of the tongue may be bonded together to convert the tongue into a tubular conduit.

The sachet shown in FIG. 6 has been brewed in an apparatus similar to that shown in FIG. 3. In particular, a lower region 54 of the sachet has been pinched between a solid elastomeric member and a rigid, flat surface having a manifold of recesses indented therein, whereby a complementary dendritic manifold of recesses 55 has been impressed in the sheet material of the sachet. These recesses 55 act as conduits for the beverage from the brewing region of the sachet to define a part of the liquid conduit region of the sachet. Appropriately sized and configured impressed conduits provide control over the rate of escape of beverage from the brewing region and thereby enable optimised brewing, especially when the brewing is being carried out at elevated pressure in the brewing cavity.

The above embodiments of the present invention have been described by way of example only. Many other embodiments falling within the scope of the accompanying claims will be apparent to the skilled reader.

What is claimed is:

1. An apparatus for the brewing of a beverage by transmission of an aqueous fluid through a sachet containing a beverage brewing ingredient, said apparatus comprising:

one or more injectors to inject the aqueous fluid into the sachet during said brewing; and a clamp for the sachet, said clamp comprising one or more members that are movable to open and close the clamp, said members having inner surfaces which in a closed position of the clamp define a cavity adapted to substantially enclose and support the sachet during said brewing and further adapted to define a beverage exit pathway in a lower part of the cavity, and wherein the inner surface of at least one clamp member comprises at least one deformable region mounted on a support that is movable while the clamp is in said closed position, whereby the shape of said cavity or of said exit pathway can be changed while the clamp is in said closed position to provide a desired brewing configuration of the sachet.

2. An apparatus according to claim 1, wherein the deformable region is formed from substantially incompressible material.

3. An apparatus according to claim 1, wherein the deformable region comprises a layer of elastomer.

4. An apparatus according to claim 3, wherein the layer of elastomer covers substantially the whole of an inner surface of at least one of said clamp members.

5. An apparatus according to claim 3, wherein the layer of elastomer is supported on a rigid base member that is movable when the clamp is in said closed position.

6. An apparatus according to claim 5, wherein the deformable region is constrained by a rigid wall member extending upwardly from the rigid base member around an edge of the deformable region.

7. An apparatus according to claim 4, wherein the inner surface of the layer of elastomer is concave in the absence of an external force.

8. An apparatus according to claim 4, wherein the Shore hardness of the elastomer layer is from 10 to 60 Shore.

9. An apparatus according to claim 4, wherein the thickness of the solid elastomer layer is from 5 to 25 mm.

10. An apparatus according to claim 1, wherein the deformable regions comprise a membrane supported on a fluid reservoir.

11. An apparatus according to claim 10, wherein the apparatus further comprises a conduit to introduce or remove fluid from the reservoir in order to vary the shape of the cavity during or immediately prior to brewing.

12. An apparatus according to claim 11, wherein the conduit contains an electro-rheological fluid or a mechanical or electromechanical valve.

13. An apparatus according to claim 11, wherein the conduit is connected to a pump or other mechanical or electromechanical driving means for introducing or removing fluid from the cavity.

14. An apparatus according to claim 10, wherein the deformable region comprises a plurality of fluid filled reservoirs supporting a plurality of membrane regions.

15. An apparatus according to claim 10, wherein the inner surface of the clamp comprises, in addition to said deformable region supported on a fluid reservoir, at least one region of solid elastomer supported on a rigid base.

16. An apparatus according to claim 1, wherein said exit region from the brewing chamber comprises at least one clamp member configured to pinch the bottom of the sachet.

17. An apparatus according to claim 16, wherein at least one of the members providing said pinch has a resilient inner surface in said fluid exit region.

18. An apparatus according to claim 16, wherein at least one of the members providing said pinch comprises an inner surface with a recess defining a fluid exit pathway through said pinch.

19. An apparatus according to claim 1, wherein the clamp comprises two members that are movable together in face-to-face relationship to form said cavity.

20. An apparatus according to claim 1, further comprising a mechanism operatively associated with the clamp to retract the injector when the clamp is opened.

21. An apparatus according to claim 1, wherein the injector comprises a hollow needle that projects into said cavity at an oblique angle to the exit direction of the beverage from the cavity.

22. An apparatus according to claim 21, wherein the hollow needle projects into said cavity substantially perpendicularly to the exit direction of the beverage from the cavity.

23. An apparatus according to claim 1, wherein the one or more injectors projects inwardly from an inner surface of one of the clamp members, and said inner surface comprises a recess around the injector.

24. An apparatus according to claim 23, wherein the depth of the recess is from about 1 mm to about 10 mm.

25. An apparatus according to claim 23, wherein the mean width of the recess is from about 5 mm to about 50 mm.

26. A method of brewing a beverage comprising the steps of:

providing a sachet formed at least in part from flexible film material and containing a beverage brewing ingredient;

inserting the sachet into the clamp of an apparatus according to claim 1;

injecting an aqueous fluid into the sachet in said clamp to brew the beverage; and collecting the beverage exiting from the exit pathway of the clamp.

27. A method according to claim 26, wherein the step of inserting is carried out such that a liquid exit portion of the sachet extends through the exit region of the clamp, whereby the beverage exiting the sachet does not contact the clamp.

28. A method according to claim 27, wherein said clamp constricts said liquid exit portion of said sachet during said brewing.

29. A method according to claim 26, wherein the aqueous fluid is injected at a pressure of from 10 to 1600 kPa (0.1 to 16 bar) gauge.

30. A method according to claim 29, wherein the aqueous fluid is injected at a pressure of from 500 to 1500 kPa (5 to 15 bar) gauge.

31. A method according to claim 26, wherein the aqueous fluid is injected at a temperature of from 1 to 100° C.

32. A method according to claim 31, wherein the aqueous fluid is injected at a temperature of from 85 to 95° C.

33. A method according to claim 26, wherein the aqueous fluid consists essentially of water at 80 to 100° C., the water is injected at a pressure of from 200 to 1600/(2 to 16 bar) gauge, and the brewing ingredient comprises ground coffee, whereby the beverage is an espresso-type coffee.

34. A method according to claim 26, further comprising the step of injecting air into the sachet after brewing to expel residual beverage from the sachet.

35. A method according to claim 26, wherein the method further comprises moving said deformable region of the clamp during brewing in order to vary the configuration of the sachet during brewing.

36. A method according to claim 35, wherein the method comprises moving the deformable region of the clamp outwardly during brewing to allow expansion of the sachet in the cavity.

37. A method according to claim 35, wherein the method comprises oscillating said region during brewing.

38. A method according to claim 26, wherein the method further comprises moving said deformable region inwardly after brewing in order to compress the sachet and squeeze out residual beverage from the sachet.

39. A method according to claim 26, wherein the method further comprises moving said deformable region before, during or after brewing in order to regulate the rate of flow of the beverage out of the cavity and/or to control the fluid pressure inside the cavity.

40. A method according to claim 26, wherein the beverage brewing ingredient comprises a foamable beverage ingredient.

41. A method according to claim 40, wherein the beverage brewing ingredient consists essentially of a dehydrated milk product.

42. A method according to claim 26, wherein the beverage exiting from the exit pathway of the clamp emerges as at least one jet having a diameter of from about 0.5 to about 2 mm.

43. A method according to claim 42, wherein the jet velocity is from about 5 to about 50 m/sec.

44. A method according to claim 26, wherein the water is injected into the sachet at a rate of about 50 to about 2000 ml/mm.

45. A method according to claim 26, wherein the sachet comprises: a capsule containing a beverage brewing ingredient and a flexible liquid guide extending from the capsule, wherein the liquid guide is provided with a freshness barrier that is releasable during brewing to enable a beverage brewed within the capsule to escape by flowing out through the liquid guide.

46. A method according to claim 45, wherein the liquid guide extends for at least 15 mm, preferably at least 20 mm.

47. A method according to claim 45, wherein the liquid guide is tapered.

48. A method according to claim 26, wherein:

the sachet comprises front and back sheets of substantially water-impermeable film material, each said sheet having a respective shape;

the front and back sheets are bonded together around a bonding perimeter to define a capsule containing the beverage brewing ingredient within said perimeter and margins of each sheet extending outside the perimeter; and the said margins include a tapered margin region on a first side of the capsule.

49. A method according to claim 48, wherein the front and back sheets are bonded together on said first side of the capsule by a bond that is releasable by the hot water and/or pressure to allow a beverage brewed in the capsule to escape therefrom.

50. A method according to claim 48, wherein the front and back sheets of substantially water-impermeable film material each have substantially the same size and shape and substantially overlap each other.

51. A method according to claim 26, wherein the sachet has an elongated shape.

52. A method according to claim 26, wherein the sachet is substantially rectangular, oval, tapered or an isosceles triangle.

53. A method according to claim 45, wherein the liquid guide 5 comprises an extension of two sheets of material that form the brewing region of the sachet in face to face relationship to define the liquid guide therebetween.

54. A method according to claim 45, wherein the liquid guide is formed at least in part by one or more conduits impressed into the sheet 10 material of the sachet.

55. A method according to claim 45, wherein the sachet further comprises a filter for the beverage brewing ingredient located between the brewing ingredient and the liquid guide.

56. A method according to claim 55, wherein the filter is a sheet of filter material bonded around its edges to a front or back face of the sachet, whereby the beverage flows through the filter material in a direction substantially perpendicular to the said front or back face.

57. A method according to claim 45, wherein the liquid guide terminates in one or more drip-forming points.

58. A system for brewing beverages by a method according to claim 26, said system comprising a beverage brewer according to claim 1 and at least one beverage brewing sachet for use in the brewer.

59. A system according to claim 58, wherein the said at least one beverage brewing sachet comprises a first sachet containing a foamable dairy or non-dairy milk concentrate and a second sachet containing a coffee or tea brewing ingredient.

60. A system according to claim 58, wherein the beverage brewer comprises a second clamp for holding a second sachet for simultaneous or sequential brewing of first and second beverage components from the first and second sachets.

* * * * *